United States Patent [19]

Smith

[11] Patent Number: 4,581,240

[45] Date of Patent: Apr. 8, 1986

[54] PROCESS FOR INCREASING YIELD OF CHEESE CURD

[76] Inventor: Gerald W. Smith, 12446 Court Dr., Sunset Hills, Mo. 63127

[21] Appl. No.: 507,101

[22] Filed: Jun. 23, 1983

Related U.S. Application Data

[63] Continuation of Ser. No. 285,914, Jul. 23, 1981, abandoned, which is a continuation of Ser. No. 61,835, Jul. 30, 1979, abandoned.

[51] Int. Cl.$^4$ .................. A23C 19/02; A23C 19/05
[52] U.S. Cl. ..................................... 426/582; 426/36; 426/40
[58] Field of Search .................. 435/36, 40, 580, 582

[56] References Cited

U.S. PATENT DOCUMENTS 3,012,899 12/1961 Angerer et al. .................. 426/40 X
3,316,098  4/1967 Hoznick et al. .................. 426/40
3,535,304 10/1970 Muller et al. .................... 426/580 X
3,988,481 10/1976 Coulter et al. ................... 426/36

OTHER PUBLICATIONS

Kosikowski, F., Cheese and Fermented Milk Foods, published by the author, Ithaca, N.Y., 1966 (pp. 67, 68 & 384–387).
Webb, et al., Byproducts from Milk, 2nd ed. The Avi Publishing Co., Inc., Westport, Conn., 1970 (pp. 186, 191, 317–322 and 395–401).

Primary Examiner—David M. Naff
Attorney, Agent, or Firm—Rey Eilers

[57] ABSTRACT

The amount of cheese curd such as cottage cheese curd which can be obtained from milk is increased by adding a caseinate to the milk and heating the milk to 180° F. or higher before forming the curd. The amount of caseinate is preferably about 0.35 to about 0.5%. Calcium is preferably added to the milk to provide curd firmness, and a water-origin colloid gum may also be added. Yield increase results from substantially all whey proteins in the milk becoming part of the curd, rather than remaining in suspension and being lost when whey is drained from the curd.

5 Claims, No Drawings

PROCESS FOR INCREASING YIELD OF CHEESE CURD

This application is a continuation of application Ser. No. 285,914, filed July 23, 1981, which is a continuation of application Ser. No. 061,835, filed July 30, 1979, both now abandoned.

FIELD OF THE INVENTION

The curd for cottage cheese and cheddar cheese is made from skim milk; and the present invention provides a process for obtaining a maximum amount of curd from skim milk.

DESCRIPTION OF THE PRIOR ART

Methods have been proposed to increase the amount of curd for cheese which can be obtained from skim milk; and one of those methods contemplates the use of a heating step wherein the skim milk is subjected to more heat than is used in most pasteurization processes. While that method can increase the amount of curd which can be obtained from skim milk, the cost of that method is considerably higher than normal; because that method requires more than the usual amount of heat and hence requires more than the usual amount of cooling.

SUMMARY OF THE INVENTION

The present invention increases the amount of curd for cheese which can be obtained from skim milk by adding a caseinate to that skim milk before that curd is formed. That caseinate causes substantially all of the whey proteins in the skim milk to commingle with the casein-type curd as that curd is formed rather than to remain in suspension and then be lost when the whey is drained away from that curd. Increases of from thirty percent to fifty percent in the amount of cottage cheese curd are attainable by use of the present invention. It is, therefore, an object of the present invention to provide a method of increasing the amount of curd for cheese which can be obtained from skim milk by adding a caseinate to the skim milk before that curd is formed.

The method of the present invention utilizes the same kind and quality skim milk which is customarily used in making cheese curd. Further, the pasteurizing and curd-making steps of the present invention can be carried out in the pasteurizing and curd-making equipment which is customarily utilized by dairies in making cheese curd. As a result, the method of the present invention has wide application. It is, therefore, an object of the present invention to provide a method of increasing the amount of cheese curd which can be obtained from skim milk by using standard and usual skim milk and by using standard and usual pasteurizing and curd-making equipment.

DESCRIPTION OF THE PREFERRED EMBODIMENTS

Raw sweet skim milk, which has a normal and usual range of solids content, has caseinate and calcium chloride and, if desired, a water-origin colloid gum added to it; and then that skim milk is pasteurized, is cooled, is placed in a cheese-making vat with a coagulator and an acidifying-additive, and is permitted to set until the pH thereof attains a desired value. The resulting curd is cut and cooked, subsequently has the whey drained away, and then is washed and salted. The method of the present invention can be carried out in pasteurizing and curd-making equipment of standard and usual design, and that method can be essentially identical to the standard and usual methods of making cheese curd -- basically differing from those methods by adding a caseinate. That method also differs from the standard and usual methods of making cheese curd by adding more calcium, by adding a water-origin colloid gum, and by cutting the curd while it has a slightly higher-than normal pH. The addition of the caseinate causes the whey proteins, which normally remain in the whey, and hence are drained away and discarded, to commingle with the casein-type cheese curd and constitute a part of that curd. In becoming a part of the cheese curd, the whey proteins provide an overall increase in curd production of between twenty percent and fifty percent. The resulting cheese curd has the desirable flavor, body, consistency and keeping qualities of standard and usual cheese curd; and the drained off and discarded whey is almost wholly devoid of whey proteins.

EXAMPLE 1

Twenty-five and eight-tenths (25.8) pounds of raw skim milk, which had nine percent (9%) solids, had nine hundred and three ten-thousandths (0.0903) of a pound of sodium caseinate, thirty-eight ten-thousandths (0.0038) of a pound of carrageenan, and seventy-nine ten thousandths (0.0079) of a pound of calcium chloride added to it. The sodium caseinate equals about thirty-five one hundredths of a percent (0.35%) and the carrageenan equals about fifteen thousandths of a percent (0.015%) of the weight of the skim milk. Thereafter, that skim milk was heated to one hundred and ninety degrees Fahrenheit (190° F.) for thirty (30) seconds to pasteurize it; and then was cooled to ninety degrees Fahrenheit (90° F.). Four and eight-tenths (4.8) milliliters of a diluted (1:100) commercial coagulator which is sold under the mark EMPORASE, and sixteen (16) fluid ounces of a commercial acid-producing culture which is known as Culture 41 of Hansen Laboratory were added to the cool skim milk; and, at that time, the pH of the skim milk was six and seven tenths (6.7). The commercial coagulator was a mixture of enzymes produced by the growth of a pure culture of the mucor pusillus lindt mold on a sterlized vegetable substrate, and the acid-producing culture was a blend of strains of Streptococcus Lactis, Streptococcus Cremoris and Leuconost$^{oc}$ Citrovorum grown in skim milk. The temperature of the skim milk was held at ninety degrees Fahrenheit (90° F.) until the pH reached four and ninety-five hundredths (4.95); and that pH was reached in four and one-half (4.5) hours. At that time the resulting curd was cut; and then that curd was heated to a temperature of one hundred and forty degrees Fahrenheit (140° F.). Thereupon, the whey was drained away, and cold water was applied to the curd to cool it to forty degrees Fahrenheit (40° F.). That cold water was permitted to drain away for half an hour; and then the curd was collected and weighed; and the weight of the curd was four and sixty-two hundredths (4.62) pounds. That amount of curd represents a yield of one and ninety-two (1.92) pounds of curd per pound of milk solids in the raw skim milk and in the skim milk of the acid-producing culture. That curd had a flavor, body, consistency and taste which at least equalled those of cottage cheese curd produced by standard commercial methods of making cottage cheese curd.

The amount of curd yielded by the method of Example 1 was one and two tenths (1.2) pounds greater than the amount of curd that was obtained when an equal amount of raw skim milk was used to make cottage cheese curd by a standard and usual commercial method. In that method, the twenty-five and eight-tenths (25.8) pounds of raw skim milk had nine percent (9%) solids, had two and thirty-four hundredths (2.34) grams of calcium chloride added to it, and then was pasteurized at one hundred and sixty-three degrees Fahrenheit (163° F.) for seventeen (17) seconds. That skim milk was cooled to ninety degrees Fahrenheit (90° F.); and one-half (0.5) of a milliliter of commercial coagulator, which is sold under the mark EMPORASE, and sixteen fluid ounces of acid-producing culture, which is known as Culture 41 of Hansen Laboratory, were added to that skim milk. At that time, the pH of the skim milk was six and seven-tenths (6.7). The temperature of the skim milk was held at ninety degrees Fahrenheit (90° F.) until the pH reached four and sixty-five hundredths (4.65); and that pH was reached in four hours. Thereupon, the resulting curd was heated to a temperature of one hundred and thirty-five degrees Fahrenheit (135° F.), the whey was drained away, and cold water was applied to the curd to cool it. That cold water was permitted to drain away, and then the curd was collected and weighed; and the weight of the curd was three and forty-two hundredths (3.42) pounds. That amount of curd represents a yield of one and forty-two hundredths (1.42) pounds of curd per pound of milk solids in the raw skim milk and in the skim milk of the acid-producing culture.

The method of Example 1 produced a yield of cheese curd which was one and two tenths (1.2) pounds greater than the yield of cheese curd obtained by use of the standard and usual method. That increased yield represents an increase in yield of one-half (0.5) of a pound of curd per pound of solids in the raw skim milk and in the skim milk of the acid-producing culture; and that yield represents an increase in yield of thirtyfive percent (35%).

EXAMPLE 2

Twenty-five and eight-tenths (25.8) pounds of raw skim milk, which had ten and two-tenths percent (10.2%) solids, had one hundred and three thousandths (0.103) of a pound of sodium caseinate, twenty-five ten-thousandths (0.0025) of a pound of carrageenan, and seventy-nine ten thousandths (0.0079) of a pound of calcium chloride added to it. Thereafter, that skim milk was heated to one hundred and ninety degrees Fahrenheit (190° F.) for thirty (30) seconds to pasteurize it; and then was cooled to ninety degrees Fahrenheit (90° F.). Four and eight-tenths (4.8) milliliters of a diluted (1:100) commercial coagulator which is sold under the mark EMPORASE, and sixteen (16) fluid ounces of a commercial acid-producing culture which is known as Culture 41 of Hansen Laboratory were added to the cool skim milk; and, at that time, the pH of the skim milk was six and fifty-five hundredths (6.55). The sodium caseinate equals about four tenths of a pecent (0.4%) and the carrageenan equals about one hundredth of a percent (0.01%) of the weight of the skim milk. The temperature of the skim milk was held at ninety degrees Fahrenheit (90° F.) until the pH reached four and nine-tenths (4.9); and that pH was reached in five hours. At that time the resulting curd was cut; and then that curd was heated to a temperature of one hundred and forty degrees Fahrenheit (140° F.). Thereupon, the whey was drained away, and cold water was applied to the curd to cool it to forty degrees Fahrenheit (40° F.). That cold water was permitted to drain away; and then the curd was collected and weighed; and the weight of the curd was five and sixty-two hundredths (5.62) pounds. That amount of curd represents a yield of two and thirteen hundredths (2.13) pounds of curd per pound of milk solids in the raw skim milk and in the skim milk of the acid-producing culture. That curd had a flavor, body, consistency and taste which at least equalled those of cottage cheese curd produced by standard and commercial methods of making cottage cheese curd.

The two and thirteen hundredths (2.13) pounds of curd per pound of milk solids in the raw skim milk and in the skim milk of the acid-producing culture is significantly greater than the one and forty-two hundredths (1.42) pounds of curd per pound of milk solids in the raw skim milk and in the skim milk of the acid-producing culture which was obtained in the hereinbefore-described example of a standard and usual commercial method of making cottage cheese curd. That increase in yield repreesnts an increase in yield of fifty percent (50%).

EXAMPLE 3

Four thousand and forty-two (4,042) pounds of raw skim milk, which had nine percent (9%) solids, had fourteen and ninety-five hundredths (14.95) pounds of caseinate, four-tenths (0.4) of a pound of carrageenan and one and thirty-two hundredths (1.32) pounds of calcium chloride added to it. The caseinate equalled about thirty-seven hundredths of a percent (0.37%) and the carrageenan equalled about one hundredth of a percent (0.01%) of the weight of the skim milk. Thereafter, that skim milk was heated to one hundred and ninety-five degrees Fahrenheit (195° F.) for seventeen (17) seconds to pasteurize it; and then was cooled to ninety degrees Fahrenheit (90° F.). Seventy (70) milliliters of undiluted commercial coagulator which is sold under the mark EMPORASE, and twenty (20) gallons of acid-producing culture which is known as Culture 41 of Hansen Laboratory, were added to the cooled skim milk; and, at that time, the pH of the skim milk was six and six-tenths (6.6). The temperature of the skim milk was held at ninety degrees Fahrenheit (90° F.) until the pH reached five and two tenths (5.2), and that pH was reached in four (4) hours. At that time the resulting curd was cut; and then that curd was heated to a temperature of one hundred and forty-eight degrees Fahrenheit (148° F.). Thereupon, the whey was drained away, and cold water was applied to the curd to cool it to forty degrees Fahrenheit (40° F.). That cold water was permitted to drain away; and then the curd was collected and weighed; and the weight of the curd was seven hundred and one (701) pounds. That amount of curd represents a yield of one and eighty-four hundredths (1.84) pounds of cheese per pound of milk solids in the raw skim milk and in the skim milk of the acid-producing culture. That curd had a flavor, body, consistency and taste which at least equalled those of cottage cheese curd produced by standard commercial methods of making cottage cheese curd.

The one and eighty-four hundredths (1.84) pounds of curd per pound of milk solids in the raw skim milk and in the skim milk of the acid-producing culture is slighlty less than the yield of pounds of curd per pound of milk solids obtained in Example 1. However, that yield is importantly greater than the one and forty-two hundredths (1.42) pounds of curd per pound of milk solids which was obtained in the hereinbefore described example of a standard and commercial method of making cottage cheese curd. That increase in yield represents an increase in yield of almost thirty percent (30%).

EXAMPLE 4

Twenty-five and eight-tenths (25.8) pounds of raw skim milk, which had nine percent (9%) solids, had one hundred and twenty-nine thousandths (0.129) of a pound of sodium caseinate and seventy-nine ten thousandths (0.0079) of a pound of calcium chloride added to it. The sodium caseinate equals about one-half of a percent (0.5%) of the weight of the skim milk. Thereafter, that skim milk was heated to one hundred and ninety degrees Fahrenheit (190° F.) for thirty (30) seconds to pasteurize it; and then was cooled to ninety degrees Fahrenheit (90° F.). Four and eight-tenths (4.8) milliliters of a diluted (1:100) commercial coagulator which is sold under the mark EMPORASE, and sixteen (16) fluid ounces of a commercial acid-producing culture which is known as Culture 41 of Hansen Laboratory were added to the cool skim milk; and, at that time, the pH of the skim milk was six and six-tenths (6.6). The temperature of the skim milk was held at ninety degrees Fahrenheit (90° F.) until the pH reached four and ninety-five hundredths (4.95); and that pH was reached in four (4) hours. At that time the resulting curd was cut; and then that curd was heated to a temperature of one hundred and thirty-five degrees Fahrenheit (135° F.). Thereupon, the whey was drained away, and cold water was applied to the curd to cool it to forty degrees Fahrenheit (40° F.). That cool water was permitted to drain away; and then the curd was collected and weighed; and the weight of the curd was four and forty-three hundredths (4.43) pounds. That amount of curd represents a yield of one and ninety hundredths (1.90) pounds of curd per pound of milk solids in the raw skim milk and in the skim milk of the acid-producing culture. That curd had a flavor, body, consistency and taste which at least equalled those of cottage cheese curd produced by standard commercial methods of making cottage cheese curd.

The amount of curd yielded by the method of Example 4 was almost the same as the amount of curd that was obtained with Example 1. Consequently, the method of Example 4 produced a yield of cheese curd which represented an increase, over the yield of cottage cheese curd of the example of commercial methods of making cottage cheese curd, of almost thirty-five percent (35%).

EXAMPLE 5

Twenty-five and eight-tenths (25.8) pounds of raw skim milk, which had nine percent (9%) solids, had nine hundred and three ten-thousandths (0.0903) of a pound of sodium caseinate, twenty-five ten-thousandths (0.0025) of a pound of carrageenan, and seventy-nine ten thousandths (0.0079) of a pound of calcium chloride added to it. The sodium caseinate equals about thirty-five hundredths of a percent (0.35%) and the carrageenan equals about one hundredth of a percent (0.01%) of the weight of the skim milk. Thereafter, that skim milk was heated to one hundred and ninety degrees Fahrenheit (190° F.) for thirty (30) seconds to pasteurize it; and then was cooled to forty degrees Fahrenheit (40° F.). Twenty-seven and three-tenths (27.3) grams of food grade, seventy-five percent (75%) phosphoric acid were added to the cool skim milk to lower the pH to four and nine-tenths (4.9); and that pH was reached almost immediately. Thereupon, the temperature was raised to sixty-eight degrees Fahrenheit (68° F.); and then four and eight-tenths (4.8) milliliters of a diluted (1:100) commercial coagulator which is sold under the mark EMPORASE was added to the skim milk.

The skim milk was allowed to set for ninety (90) minutes, and then the resulting curd was cut. Thereafter that curd was heated to one hundred and thirty-five degrees Fahrenheit (135° F.), the whey was drained away, and cold water was applied to the curd to cool it. That cold water was permitted to drain away, and then the curd was collected and weighed; and the weight of the curd was four and two-tenths (4.2) pounds. That amount of curd represents a yield of one and eighty-one hundredths (1.81) pounds of curd per pound of milk solids in the raw skim milk. That curd had a flavor, body, consistency and taste which at least equalled those of cottage cheese curd produced by standard and commercial methods of making cottage cheese curd.

The one and eighty-one hundredths (1.81) pounds of curd per pound of milk solids in the raw skim milk is slightly less than the yield of pounds of curd per pound of milk solids obtained in Example 3. However, that yield is importantly greater than the one and forty-two hundredths (1.42) pounds of curd per pound of milk solids which was obtained in the hereinbefore described example of a standard and commercial method of making cottage cheese curd. That increase in yield represents an increase in yield of more than twenty-seven percent (27%).

EXAMPLE 6

Twenty-three and seven-tenths (23.7) pounds of whole milk with three and one-quarter percent (3.25%) butterfat and eight and three-quarters percent (8.75%) pounds of non-fat solids, had eighty-two thousandths (0.082) pounds of sodium caseinate, twenty-three ten thousandths (0.0023) of a pound of carrageenan, and seventy-nine ten thousandths (0.0079) of a pound of calcium chloride added to it. Thereafter, that milk was heated to one hundred and ninety degrees Fahrenheit (190° F.) for thirty (30) seconds to pasteurize it; and then was cooled to ninety degrees Fahrenheit (90° F.). Thirty-one (31) milliliters of undiluted commercial coagulator which is sold under the mark EMPORASE and one (1) pound of acidproducing culture which is known as Culture 41 of Hansen Laboratory, were added to the cooled milk; and, at that time, the pH of the milk was six and nine-tenths (6.9), and the acidity constituted twenty hundredths of a percent (0.20%) of the total weight of the mixture of milk, caseinate, carrageenan, calcium chloride, coagulator and acid-producing culture. The temperature of the milk was held at ninety degrees Fahrenheit (90° F.) for one (1) hour; and, at that time, the pH was six and eight-tenths (6.8) and the acidity of the whey was thirteen one hundredths of a percent (0.13%). Thereafter, that curd was heated to one hundred and two degrees Fahrenheit (102° F.); and, at that time, the pH was six and three-tenths (6.3) and the acidity of the whey was seventeen one-hundredths of a percent (0.17%). Thereupon, the whey was drained away, and cold water was was applied to the curd to cool it. That cold water was permitted to drain away, and then the curd was stacked and turned over to press out more whey. After one (1) hour, the curd was milled; and sixty-one thousandths (0.061) of a pound of table salt was added to, and mixed with, the curd. That curd had a flavor, body, consistency and taste which compared favorably with those of cheddar cheese curd produced by standard and commercial methods of making cheddar cheese curd.

The yield of the cheddar cheese curd was two and eighty-seven hundredths (2.87) pounds; and that represents a yield of eleven and six-tenths percent (11.6%) of the weight of the milk. Page 15 of American Cheese Varieties, written by Wilson and Reinhold and published by Pfizer and Company, indicates that a yield of nine and six-tenths percent (9.6%) would be a good yield for cheddar cheese curd. As a result, the method of producing cheddar cheese curd provides a yield which is almost twenty percent (20%) better than a yield which those skilled in the art regard as a good yield.

The temperature to which the skim milk, that is used in making cottage cheese curd, is heated, curing the pasteurization step of the present invention, should be higher than one hundred and eighty degrees Fahrenheit (180° F.); because few, if any, whey proteins will commingle with the cottage cheese curd where the temperature during that pasteurization step is less than one hundred and eighty degrees Fahrenheit (180° F.). Whey proteins constitute a group specificallydifferent proteins; and some of those proteins will commingle with the cottage cheese curd if the pasteurization temperature is in the range of one hundred and eighty degrees Fahrenheit (180° F.) to one hundred and ninety degrees Fahrenheit (190° F.), whereas other of those proteins will not. Some of those other proteins will commingle with the cottage cheese curd if the pasteurization temperature is in the range of one hundred and ninety degrees Fahrenheit (190° F.) to two hundred degrees Fahrenheit (200° F.), whereas further of those other proteins will not. Some of those further proteins will commingle with the cottage cheese curd if the pasteurization temperature is in the range of two hundred degrees Fahrenheit (200° F.) to two hundred and twenty degrees Fahrenheit (220° F.). The amount of whey proteins which can be obtained by use of the method of the present invention will increase as the pasteurization temperature is increased; but most pasteurization equipment used in cheese-making plants can not heat the milk to temperatures as high as two hundred degrees Fahrenheit (200° F.). Consequently, although the preferred range of pasteurization temperatures is between one hundred and eighty degrees Fahrenheit (180° F.) and two hundred and twenty degrees Fahrenheit (220° F.), the pasteurization temperature which will be used will usually be limited by the heating capabilities of the pasteurization equipment in the cheese-making plants to the range of one hundred and eighty degrees Fahrenheit (180° F.) to one hundred and ninetyfive degrees Fahrenheit (195° F.).

Sodium caseinate is preferred as the caseinate which is used in the method provided by the present invention; because it is safe to use, it is relatively plentiful, and it is relatively inexpensive. However, potassium caseinate or any other readily-ionizable caseinate could be used.

The amount of caseinate which is added to the skim milk before it is pasteurized can be as low as thirty-five hundredths of a percent (0.35%) of the weight of the skim milk, can be as high as one-half of one percent (0.5%) of the weight of that skim milk, or can be any value between thirty-five hundredths of a percent (0.35%) and one-half of one percent (0.5%) of the weight of that skim milk. Adding more than one-half of one percent (0.5%) of caseinate adds costs without a corresponding benefit, and hence is not desirable. The preferred amount of sodium caseinate is between four-tenths of one percent (0.4%) and one-half of one percent (0.5%) of the weight of the skim milk. Less than thirty-five hundredths of a percent (0.35%) of caseinate could be used if, for any reason, only limited amounts of whey protein were desired.

It is possible to decrease the amount of sodium caseinate which is used by adding small amounts of safe, water-origin, colloid gums such as carrageenan and agar-agar. A comparison of Examples 1 and 4 shows that the addition, in Example 1, of fifteen thousandths of one percent (0.015%) of carrageenan made it possible to attain a yield of cottage cheese curd per pound of milk solids which was slightly higher than the yield of cottage cheese curd per pound of milk solids of Example 4, even though the method of Example 1 used only thirty-five hundredths of one percent (0.35%) of sodium caseinate whereas the method of Example 4 used one-half of one percent (0.5%) of sodium caseinate. The carrageenan is believed to facilitate the action of the whey proteins in commingling with the casein-type cottage cheese curd as that curd forms. Agar-agar is believed to provide a similar action.

It is customary, in the making of cottage cheese curd, to add small amounts of calcium chloride to the skim milk during the processing thereof; because calcium chloride helps provide a desirable degree of firmness for that cottage cheese curd. Because the method of the present invention produces higher-than-normal amounts of cheese curd per pound of milk solids, higher-than-usual amounts of calcium chloride are used. That calcium chloride could be added in dry form, but it preferably is added in the form of a calcium chloride solution; and in either event will be more than about one hundredth of a percent (0.01%) of the weight of the skim milk.

In many commercial methods of making cottage cheese curd, the skim milk is permitted to set until the pH thereof decreases to a value in the range of four and sixty-five hundredths (4.65); and it usually takes about four hours for the pH of the skim milk to decrease to such a value. In the method of making cottage cheese curd provided by the present invention, the setting of the skim milk is halted when the pH thereof decreases to a value in the range of four and eight-tenths (4.8) to five and three-tenths (5.3).

The milk which was used in Examples 1–5 was fresh skim milk. If desired, that milk could be obtained by mixing dried skim milk with water to provide a skim milk with the desired solids content.

The foregoing specification has described several preferred embodiments of the present invention, but it should be understood that various changes can be made in the method of the present invention without affecting the scope thereof.

What I claim is:

1. The method of increasing the yield in a process of forming cottage cheese curd which comprises adding a readily ionizable caseinate to milk that has whey protein therein, said caseinate being added in the proportion of about thirty-five hundredths of one percent to about one-half of one percent (0.35–0.5%) of the weight of said milk, adding calcium in an amount to provide firmness for said cottage cheese curd when said cottage cheese curd is formed, thereafter pasteurizing the milk at a temperature of about one hundred and eighty degrees Fahrenheit (180° F.) or higher, and forming cottage cheese curd from said pasteurized milk.

2. The method as claimed in claim 1, wherein in addition to said caseinate a water origin colloid gum is added to the milk, and wherein the amount of calcium constitutes more than about one hundredth of one percent (0.01%) of the weight of said milk.

3. The method as claimed in claim 1 wherein said caseinate is added in the form of sodium caseinate.

4. The method as claimed in claim 1 wherein a water origin colloid gum and said caseinate are added to said milk prior to the pasteurizing of said milk.

5. The method as claimed in claim 1 wherein a gum and said caseinate are added to said milk prior to the pasteurizing of said milk, and wherein said gum is selected from the group consisting of carrageenan and agar-agar.

* * * * *